UNITED STATES PATENT OFFICE 2,574,784

PHENOLIC ADHESIVE AND METHOD OF BONDING WOOD PLIES

Clark C. Heritage, Cloquet, Minn., assignor to Weyerhaeuser Timber Company, Longview, Wash., a corporation of Washington No Drawing. Application December 26, 1944, Serial No. 569,909

19 Claims. (Cl. 154—133)

This invention relates to the formulation of phenolic resin adhesives, the process of making phenolic resin adhesives possessing new and unusual properties, and the manufacture of a laminated construction unit employing the novel adhesive product of such process.

The instant invention has for its objects the provision of a new adhesive derived from bark; the provision of a novel adhesive containing comminuted bark; the provision of a new phenolic adhesive which may contain relatively small amounts of phenolic resin; the provision of a novel adhesive which is low in cost; the provision of an adhesive of high bonding strength; the provision of a new phenolic adhesive of excellent spreadability and controlled penetration; the provision of a new adhesive, relatively low usages of which may be applied without loss of bonding strength; the provision of an adhesive well adapted for spreading evenly on rough surfaces and thereby giving complete coverage of the surfaces to be glued; the provision of an adhesive which may readily be spread using ordinary gluing machines; the provision of an adhesive of high bonding strength which derives its strength in part from the chemical combination of bark with the other constituents of the adhesive mixture; the provision of an adhesive which, though it may contain a relatively large proportion of bark, is stable and does not separate into its constituent parts upon standing or upon application by means of mechanical glue spreaders; the provision of a novel phenolic adhesive adaptable for use in the gluing of a large number of different types of materials, but particularly in the gluing of veneers to produce plywood; and the provision of a phenolic adhesive which is adaptable for use in the production of bonded materials such as plywood by standard procedures.

It is the teaching of the instant invention that these and other objects of the invention may be accomplished through the formulation and use of a novel adhesive composition containing comminuted bark. The components of the mixture are variable, but may comprise, in general, a phenolic resin, comminuted bark, a diluent, and a catalyst. Other ingredients such as dyes, other resins, anti-foaming agents, setting agents, etc., may also be incorporated into the adhesive mixture if desirable or necessary.

Use of the presently described adhesive compositions results in the formation of exceptionally strong bonds uniting the glued surfaces, as is shown, for example, by the results of shear and wood failure tests, hereinafter described, carried out on plywood in which the adhesives of the invention are employed. It has been established that the quality of the bond is attributable, at least in part, to the fact that the bark constituent of the adhesive mixture participates actively in the chemical reactions and changes occurring during the setting process. The comminuted bark is heat reactive and adhesive in character, and appreciably augments the adhesive properties of the mixture. The adhesives of the invention are lower in cost than comparable adhesives of the prior art and, when employed in the manufacture of plywood, result in substantial savings. This reduction in cost is at least partly attributable to the fact that less adhesive (i. e., lower spreads) may be employed, and also to the fact that the adhesive mixture contains major proportions of inexpensive ingredients, i. e., the comminuted bark of trees and water. The adhesive is easily handled, and may be used in ordinary gluing and pressing machines. It has exceptionally good spreadability, due to the flowability of the combination of bark and resin, relatively low spreads completely covering rough surfaces such as rough core veneers being readily obtainable. The bonds are exceptionally durable and withstand long periods of use under adverse conditions without delamination or other evidences of failure.

These and other objects and advantages of the invention are achieved by the employment of processes and procedures embodying the invention as illustrated in the following description.

Although a large variety of trees produce bark which is suitable for the production of a product which may be used in adhesive compositions, the bark of certain of the coniferous trees is especially suitable for this purpose. Such trees include the coniferous trees of commerce such as the firs, the pines, the cedars, and the hemlocks, the bark of such trees being readily obtainable as a by-product of industries utilizing the woody portion of the tree. For example, the bark of trees of the genus Pinus, such as the soft or white pines, sugar pines, western yellow pine, and southern pine, constitutes approximately 12% of the log, calculated on the weight of the unbarked wood. Moreover, pine forests comprise an important source of logs for commercial lumber, and so constitute an almost inexhaustible source of supply of pine bark.

The pinaceous trees of the genus Pseudotsuga, of which there is a single species, taxifolia, commonly known as the Douglas fir, are characterized by a large percentage of bark (approximately 11%). The Douglas fir constitutes an important source of commercial timber, so that great quantities of Douglas fir bark are available, there being an average of 480 pounds of oven dry bark for each thousand feet log scale by actual test.

The pinaceous trees of the genus Picea, and particularly white spruce, are also characterized by a high percentage of bark. In this tree the bark constitutes from 12% to 13%. Moreover, spruce lumber is an important commercial product, and the bark of the spruce is available in considerable quantities, making utilization of this product entirely feasible from a commercial point of view.

In general, the barks of trees comprise periderm, phellem or cork, and phloem which consists of a collection of sieve tubes and parenchyma, and frequently bast fibers or stone cells. Pieces of bark from separate trees show a wide variation of relative amounts of cork and phloem, grading from pieces consisting almost entirely of phloem and having but thin lunes of cork, to those consisting of large masses of cork or phelloderm with small islands of phloem existing in the cork. Microscopically, the phellem or cork is composed of layers of non-elongated suberized cells partially filled with air and of low specific gravity. The constituents of the phloem are longitudinal cells comprising sieve tubes, frequently bast fibers or stone cells, phloem parenchyma, and radial cells comprising ray parenchyma.

It has been discovered that by adjusting the friability of a bark matrix, a suitable comminuting process (as ball milling) may be employed to pulverize differentially the constituents of the bark to break the bond therebetween and so permit separation thereof by selective screening. Certain of the bark fractions, such as the cork and fiber fractions, are less friable than the others, and it may be desirable to separate these fractions from the more easily comminuted fractions in the preparation of bark for use as a constituent of adhesive compositions. Moreover, the cork and fiber fractions may be recovered substantially free from mixture or contamination and are useful for various purposes.

The particle size of the comminuted bark is variable. In general, bark ground to pass through 65-mesh Tyler screens gives consistently good results when used in accordance with the teaching of the invention as an ingredient of the herein disclosed adhesive compositions. Satisfactory particle sizes are illustrated by the following Tyler screen analyses of six different lots of comminuted bark of suitable grade for adhesive manufacture:

| Screen Size | Per Cent By Weight Yield | | | | | |
|---|---|---|---|---|---|---|
| On 65 | 1.0 | 1.0 | 1.0 | 1.0 | 1.5 | 1.5 |
| 100 | 10.0 | 13.0 | 14.0 | 13.5 | 17.5 | 13.5 |
| 200 | 38.0 | 36.5 | 37.5 | 37.5 | 40.5 | 36.5 |
| Thru 200 | 52.0 | 49.0 | 46.5 | 48.0 | 40.5 | 48.5 |

The approximate percentages of ingredients to be used in an adhesive formulation for use in the manufacture of exterior grade plywood, for example, are about 20 parts bark powder per 100 parts phenolic resin, 40 parts water, 5 parts sodium carbonate, and 4 parts sodium hydroxide. For other uses the relative amounts of the constituents may be varied depending upon the nature of the surfaces to be glued, the purpose to which the product is to be applied, the other constituents of the adhesive mixture, the viscosity it is desired to achieve, etc. Thus the ratio of bark powder to resin may vary within the general range of between about 3 parts bark powder to 1 part liquid resin (50% solids) and 1 part bark powder to 6.5 parts liquid resin (50% solids). The larger percentages of bark powder may be used, for example, in the formulation of an adhesive suitable for the preparation of plywood for use as a concrete form material.

Another of the essential ingredients of the novel adhesives of the invention is a phenol-aldehyde resin. Such resins comprise the alkali catalyzed polymerization products of an aldehyde, e. g. formaldehyde or acetaldehyde, and a phenol, e. g. phenol itself, cresols, xylenols, and/or other substituted phenols. The phenolic aldehyde condensation product used may be of the types customarily employed in the formulation of adhesive compositions. These are most commonly produced by condensation of a phenol and formaldehyde in aqueous solution in the presence of a catalyst. For example, a colloidal suspension or solution of resin is produced by mixing a phenolic body and formaldehyde in an aqueous alkaline solution and heating the mixture until the reaction is at the desired end point. A suitable viscosity is obtained by adding water or a dilute caustic soda solution. The proportion of solids usually is adjusted to about 50%.

The proportions of phenolic resin used in the adhesive compositions of the invention, like the proportions of bark powder, are variable depending upon such factors as the nature of the product to be glued and the use to which said product is to be put. Thus, although 80 to 100 parts phenolic resin may be used per 20 parts bark powder in the manufacture of exterior grade plywood, lesser quantities of resin may be used in the manufacture of other types of products. For example, as little as 8 parts resin per 20 parts bark powder may be used for the production of interior grade plywood, while usages of about 25 parts of resin per 20 parts bark powder may be acceptable in the manufacture of concrete form plywood. The relationship of usage to bark powder usage is more fully disclosed in Example 3 given hereinafter.

A diluent is also incorporated in the adhesive mixtures of the invention, and may be either water itself, or water admixed with other suitable liquids. Although variable amounts of water may be used, in general these amounts are considerably greater with the herein described adhesive compositions than with other wet adhesives because the presence of the bark powder forms a mixture of such high viscosity as to permit a very substantial dilution. Thus, whereas only about 20 parts water are used per 100 parts phenolic resin in a prior art phenolic resin adhesive, this proportion of water may be increased to as high as 40 parts water in the same phenolic adhesive composition in which bark powder has been incorporated in accordance with the invention.

An alkaline material is incorporated in the adhesive mixture to condition the bark and to promote the polymerization and consequent setting of the mixture when applied as an adhesive to solid surfaces. Suitable alkaline materials are, in general, the hydroxides, carbonates, and/or bi-carbonates of the alkali metals, particularly sodium and potassium. Sodium hydroxide and sodium carbonate are particularly suitable for this purpose. The necessary or optimum amount is variable depending upon the other constituents of the mixture and the nature of the surfaces to be glued. In general, however, it has been found that about 4 parts of sodium hydroxide and about 5 parts sodium carbonate are suitable amounts to bring about the desired thermosetting of the adhesive.

As stated above, other materials may be incorporated in the presently disclosed adhesive compositions, as desirable or necessary. Such materials comprise dyes, hardening agents, anti-foaming agents, buffer salts, etc. Thus, where it is desired to prepare a composition which does not foam when spread by ordinary gluing machines, an anti-foaming agent such as pine oil may be used. The anti-foaming agent may be used in any suitable quantity. For example, pine oil is an effective anti-foaming agent in the adhesive compositions of the invention when used in the relative proportions of from 1 to 2 parts pine oil per 100 parts phenolic resin. Likewise, suitable setting agents and/or accelerators, such as hexamethylenetetramine, may be added to hasten the setting of the glue and the formation of a strong bond.

The adhesive compositions of the invention may, in general, be prepared by reacting the constituents thereof, i. e. the phenolic resin, bark powder, sodium carbonate, sodium hydroxide, and water, until a solution or dispersion of the desired uniformity and consistency has been formed. In the formulation of a plywood adhesive it has been found preferable to provide a solution comprising hot water (ca. 180° F.) and the alkaline constituents of the adhesive mixture, e. g., the sodium carbonate and sodium hydroxide. This solution is then added to the bark powder and the mixture stirred until the bark powder is thoroughly reacted and a uniform composition is obtained. The phenolic resin is then added and the mixing continued until the reaction is complete between the phenolic resin and the above described bark powder composition and the composition has cooled to room temperature. When this reaction is completed the adhesive composition is ready for use.

Other procedures may be used, however. For example, in the production of relatively large quantities of adhesive the bark powder may be introduced into a mixer of suitable capacity. The water and the alkaline constituents of the composition are then added, preferably at a temperature of about 180° F., and are thoroughly reacted by mixing. Thereafter the phenolic resin is added and the resulting composition reacted to obtain the desired adhesive. It is then cooled to about 100° F. before spreading.

The adhesive compositions of the invention prepared by the above or other suitable methods may then be applied to the surfaces to be glued. They are satisfactory for use with a wide variety of surfaces and in the construction of diverse types of laminated units. They are particularly well adapted for use in gluing wood surfaces, as in the manufacture of plywood. In this case the adhesive may be spread on the veneers by means of the glue applicator machines usually employed in a plywood manufacturing plant. Each face of the core veneer may be coated with the adhesive and the panels assembled in the customary manner, i. e., with the grain of the face veneer disposed at right angles to that of the core veneer. The panel is then pressed in a hot press to set the adhesive and form a firmly bonded laminated product. In these operations such factors as the assembly time, precure, manner of spreading, pressing time, postcure, etc., may be varied to suit the particular adhesive composition being used and the type of material being glued.

Gluing machines of the ordinary types may be used to spread the adhesive. The adhesive compositions of the invention, when thus applied, spread uniformly and give complete coverage of the veneer surfaces. Owing to unique flow characteristics of the adhesive compositions, they are well suited for application to rough surfaces and give relatively complete and uniform coverage thereof. The desired spreads of adhesive are easily maintained. As has been noted above, these spreads are materially less than the spreads of phenolic adhesives known to the prior art. For example, spreads of from 42 to 48 pounds of the wet adhesive per thousand square feet double glue line are productive of bonds fully as strong as spreads of from 55 up to as high as 90 pounds per thousand square feet double glue line of wet adhesives used according to the teaching of the prior art. This results in very attractive economies in the cost of the glue line.

During the pressing operation, polymerization, chemical combination and other fundamental reactions occur which materially change the composition of the adhesive, causing it to set and firmly bond the surfaces of the material being glued. Test results hereinafter cited show that the use of the presently disclosed adhesive compositions results in the formation of a strong bond and, therefore, in the formation of a product which does not delaminate or blister upon removal from the presses, and which shows high shear and wood failure values when subjected to test. Examination of test specimens reveals that the amount of penetration of the adhesive mixture into the wood structure is of the order of from one to one and one-half cells, thus resulting in the creation of a sharply defined glue line and in a substantial reduction in the amount of adhesive required to form a strong bond. After removal from the presses, plywood manufactured by use of the novel adhesives of the invention may, if desired, be subjected to a period of postcure or hot storage at relatively elevated temperatures.

The adhesive compositions of the invention and the manner of their preparation and application may be illustrated by the following examples:

*Example 1.*—Representative bark powder-containing adhesive compositions for exterior grade plywood are prepared according to the following formulations:

| | Parts by weight |
|---|---|
| Phenolic resin | 100 |
| Bark powder | 20 to 25 |
| Water | 40 to 50 |
| Sodium carbonate | 5 |
| Sodium hydroxide | 4 |

As is well known, the phenolic resin is prepared by mixing a commercial phenol (85% phenol) with commercial Formalin (40% formaldehyde) and heating the mixture in the presence of a catalyst for a period of time and at a temperature necessary to produce a solution or a colloidal suspension of the desired percentage of solids. The following table is illustrative of the property values of alkali catalyzed polymerization products of an aldehyde and a phenol such as are customarily employed in the formulation of adhesive compositions. For convenience the resins are herein identified by use of Roman numerals.

| Test Data | Resin I | Resin II | Resin III |
|---|---|---|---|
| Total Solids, Per Cent | 49.58 | 49.33 | 41.0 |
| Viscosity, cps. at 25° C | 200 to 700 | 1,000 to 1,200 | 175 to 200 |
| Specific Gravity at 25°/25° | 1.1751 | 1.1630 | |
| Water Tolerance, Per Cent at 25° C | 472.0 | 39.0 | |
| pH at 25° C | 9.02 | 9.20 | 10.4 |
| Refractive Index, $n_D$ at 25° C | 1.4845 | 1.4760 | |
| Alkalinity, Per Cent NaOH | 2.0 | 2.00 | |

Two adhesive formulations were prepared with the resin identified as resin I, in one formulation the resin having a viscosity of 650 centipoises and in the other formulation the resin having a viscosity of 225 centipoises. For each formulation the composition was prepared by reacting the water, sodium carbonate, sodium hydroxide, and bark powder for about twenty minutes at a temperature of about 180° F. The resin solution was then added and the reaction continued for about ten minutes.

These adhesive compositions were used in the manufacture of ⅜" plywood comprising three ⅛" veneers, using an adhesive spread of from 42 to 48 pounds wet adhesive per thousand square feet double glue line. Other details of the operation were: Assembly time, 10 minutes; pre-cure, 35 seconds; pressing duration, two and three-quarter minutes; pressure, 200 pounds per square inch; platen temperature, 280° F.; and postcure at 200° F. for eight hours.

Plywood is subjected to standard shear and wood failure tests. According to these, the specimens to be tested in the wet condition for shearing strength at rupture are subjected to a destructive cycle consisting of boiling the plywood specimens in water for four hours, baking them at 140° F. for twenty hours, and again boiling for four hours. At the end of the second boil the specimens are cooled. They are then tested in a Riehle shear testing machine at a constant rate of loading of 750 pounds per minute, the shearing stress at rupture being recorded in pounds per square inch.

The percent wood failure over the area of the ruptured joint is estimated visually and recorded in percent.

The results of the evaluation of plywood manufactured by use of adhesive compositions made with resin I were as follows:

| Formulation Variation | Adhesive Vis. (cp.) | Pressing Duration, Min. | Wet Shear, p. s. i. | Wet Wood Failure, Per Cent |
|---|---|---|---|---|
| Bark Powder, 20 parts Water, 40 parts Resin I (650 cp.), 100 parts | 5,300 | 2½ / 3 | 159 / 161 | 91 / 98 |
| Bark Powder, 25 parts Water, 50 parts Resin I (650 cp.), 100 parts | 5,900 | 2½ / 3 | 151 / 202 | 88 / 91 |
| Bark Powder, 20 parts Water, 40 parts Resin I (225 cp.), 100 parts | 2,900 | 2½ / 3 | 188 / 164 | 98 / 95 |
| Bark Powder, 25 parts Water, 50 parts Resin I (225 cp.), 100 parts | 3,000 | 2¾ / 3½ | 163 / 198 | 89 / 84 |

*Example 2.*—Other adhesive compositions were prepared using an alkali catalyzed phenolic resin of the type identified as resin II in the foregoing table.

About 20 parts by weight bark powder, 5 parts sodium carbonate, 4 parts sodium hydroxide, and 40 parts water (at 180° F.) were reacted for twenty minutes. About 100 parts of the resin were then added at 60° F. and the reaction continued for about ten minutes. The viscosity of the final mixture as determined in a MacMichael viscosimeter was 1500 centipoises at 77° F.

The adhesive thus prepared was applied to the manufacture of 1/16" and 1/16" plywood using spreads of from 42 to 48 pounds per thousand square feet double glue line, the other conditions of manufacture being substantially those outlined in Example 1. Specimens of the plywood prepared in this manner were subjected to standard test methods for determining shear and wood failure values. Wet shear and wood failure figures were obtained by using the methods of test described in Example 1. Dry shear test values were obtained by subjecting dry samples to a constant rate of loading of 750 pounds per minute in a Riehle shear testing machine, the shearing stress at rupture being recorded in pounds per square inch. The results of these tests were as follows:

| Construction | Av. Dry Shear, p. s. i. | Av. Wood Failure, Per Cent | Av. Wet Shear, p. s. i. | Av. Wood Failure, Per Cent |
|---|---|---|---|---|
| 5/16" | 210 | 92 | 113 | 98 |
| 5/16" | 228 | 91 | 114 | 97 |
| 5/16" | 193 | 97 | 193 | 97 |
| 5/16" | 210 | 96 | 116 | 96 |
| 7/16" | 166 | 96 | 145 | 98 |
| 7/16" | 160 | 93 | 130 | 94 |
| 7/16" | 165 | 92 | 134 | 96 |

*Example 3.*—Other adhesive compositions were prepared having the following general formulation:

Parts by weight
Phenolic resin _____ 8–100
Bark powder _____ 20
Water _____ 40–50
Sodium carbonate _____ 5
Sodium hydroxide _____ 4

The phenolic resin employed was of the type identified as resin II in the foregoing table. Varying amounts of this resin were used, i. e., amounts of 100, 75, 50, 25, 15, and 8 parts by weight, the amounts of the other constituents of the formulation, except the water, being maintained as given in the general formulation above.

The adhesive compositions prepared as in Examples 1 and 2 were then employed in the manufacture of plywood, of which specimens were subjected to wet and dry shear and wood failure tests. The method of manufacture of the plywood was substantially that outlined in Example 1 hereinabove. The tests applied included standard dry shear, boiled wet shear, soaked wet shear and wood failure tests. The methods employed for determining dry shear, boiled wet shear and wood failure were those outlined hereinabove in Examples 1 and 2. The soaked wet shear tests were carried out by soaking the specimens for 24 hours in tap water at room temperature, after which the specimens were tested at a constant rate of loading of 750 pounds per minute in a Riehle shear testing machine, the shearing stress at rupture bing recorded in pounds per square inch. The results of these tests are as follows:

| Bark Powder Usage (Parts) | Resin Usage (Parts) | Water (Parts) | Dry Shear (p. s. i.) | Dry Shear % Wood Failure | Boiled Wet Shear (p. s. i.) | Boiled Wet Shear Wood Failure % | Soaked Wet Shear (p. s. i.) | Soaked Wet Shear Wood Failure % |
|---|---|---|---|---|---|---|---|---|
| 20 | 8 | 48 | 167 | 77 | 77 | 42 | 114 | 37 |
| 20 | 15 | 47 | 155 | 66 | 120 | 38 | 117 | 46 |
| 20 | 25 | 46 | 193 | 75 | 165 | 70 | 160 | 50 |
| 20 | 50 | 44 | 209 | 87 | 156 | 84 | 178 | 64 |
| 20 | 75 | 42 | 183 | 91 | 142 | 89 | 163 | 87 |
| 20 | 100 | 40 | 203 | 94 | 151 | 100 | 181 | 94 |

These results clearly indicate the relatively low resin usages which may be employed in composition with bark powder to give satisfactory bonding for the preparation of interior grade and concrete form plywood. When about 80 parts of resin are employed in the above formulations, a product is obtained which is well suited for the manufacture of exterior grade plywood, as is indicated by the satisfactory boiled wet shear and wet wood failure values. For other uses where lower wood failure values are acceptable, lower resin usages may be employed. For example, for interior grade plywood, usages of as low as 8 parts resin, and for concrete form material usages of as low as 25 parts resin may be employed in the above general formulation to give a product showing satisfactory wood failure values.

The following table is illustrative of other types of phenolic resins which have been used in the formulation of adhesive compositions embodying the invention. Resins herein identified as resin IV and resin V were made by preparing a condensation product comprising the reaction product of an admixture of resorcin and formaldehyde.

| Test Data | Resin IV | Resin V |
|---|---|---|
| Total Solids, Per Cent | 50.07 | 59.39 |
| Viscosity, cps. at 25° C | 1225.0 | 141.6 |
| Specific Gravity at 25°/25° | 1.1691 | 1.2109 |
| Water Tolerance, Per Cent at 25° C | 145.0 | |
| pH at 25° C | 7.420 | 7.499 |
| Refractive Index, $n_D$ at 25° C | 1.4678 | 1.5050 |
| Alkalinity, Per Cent as NaOH | | |

Test specimens of plywood made with adhesive compositions embodying the above resins IV and V and bark powder, and evaluated in accordance with the standard procedures described in Examples 1 and 2, showed exceptionally high shear strength and percent wood failure, both dry and after boiling.

Having now described my invention and in what manner the same may be used, what I claim as new and desire to protect by Letters Patent is:

1. An adhesive composition comprising a phenol-aldehyde resin wherein the aldehyde is selected from the group consisting of formaldehyde and acetaldehyde, and as an adhesive constituent the reaction mass resulting from chemically reacting comminuted bark, water and alkali at temperatures of about 180° F., the proportion of comminuted bark to resin on a dry weight basis being within the range of from 6 parts bark to 1 part resin to 2 parts bark to 6.5 parts resin.

2. The reaction mass resulting from chemically reacting from 1 to 6.5 parts on a dry weight basis of a phenol-aldehyde resin wherein the aldehyde is selected from the group consisting of formaldehyde and acetaldehyde with the reaction mass resulting from chemically reacting from 2 to 6 parts comminuted bark, water and alkali at temperatures of about 180° F.

3. An adhesive composition comprising 1 to 6.5 parts on a dry weight basis of a phenol-aldehyde resin wherein the aldehyde is selected from the group consisting of formaldehyde and acetaldehyde, and as an adhesive constituent the reaction product resulting from reacting a basic acting compound of an alkali metal, 2 to 6 parts by weight bark powder, and an aqueous diluent.

4. An adhesive which comprises 4 to 50 parts on a dry weight basis of a phenol-aldehyde resin wherein the aldehyde is selected from the group consisting of formaldehyde and acetaldehyde, and as an adhesive constituent the reaction product resulting from reacting 20 parts by weight comminuted Douglas fir bark, water and sodium hydroxide.

5. An adhesive which comprises a phenol-aldehyde resin wherein the aldehyde is selected from the group consisting of formaldehyde and acetaldehyde, in a range of from 4 to 50 parts on a dry weight basis, and as an adhesive constituent the reaction product resulting from reacting 20 parts by weight comminuted Douglas fir bark, water and an alkaline compound.

6. An adhesive which comprises a phenol-aldehyde resin wherein the aldehyde is selected from the group consisting of formaldehyde and acetaldehyde, in a range of from 4 to 50 parts on a dry weight basis, and as an adhesive constituent the reaction product resulting from reacting 20 parts by weight comminuted ponderosa pine bark, water and an alkaline compound.

7. An adhesive which comprises a phenol-aldehyde resin wherein the aldehyde is selected from the group consisting of formaldehyde and acetaldehyde, in a range of from 4 to 50 parts on a dry weight basis, and as an adhesive constituent the reaction product resulting from reacting 20 parts by weight comminuted western hemlock bark, water and an alkaline compound.

8. An adhesive composition suitable for use in the manufacture of exterior grade plywood, which comprises an admixture of the order of 80 to 100 parts of a phenol-aldehyde resin solution containing about 50% resin solids wherein the aldehyde is selected from the group consisting of formaldehyde and acetaldehyde, and the reaction product resulting from reacting 20 parts bark powder, 40 parts water, 5 parts sodium carbonate, and 4 parts sodium hydroxide.

9. An adhesive composition suitable for use in the manufacture of interior grade plywood, which comprises an admixture of the order of 8 parts of a phenol-aldehyde resin solution containing about 50% resin solids wherein the aldehyde is selected from the group consisting of formaldehyde and acetaldehyde, and the reaction product resulting from reacting 20 parts comminuted bark, 48 parts water, 5 parts sodium carbonate, and 4 parts sodium hydroxide.

10. An adhesive composition suitable for use in the manufacture of concrete form plywood, which comprises an admixture of the order of 25 parts of a phenol-adehyde resin solution containing about 50% resin solids wherein the aldehyde is selected from the group consisting of formaldehyde and acetaldehyde, and the reaction product resulting from reacting 20 parts comminuted bark, 46 parts water, 5 parts sodium carbonate, and 4 parts sodium hydroxide.

11. An adhesive composition suitable for use in the manufacture of plywood, comprising 8 to 100 parts of a phenol-aldehyde resin solution containing about 50% resin solids wherein the aldehyde is selected from the group consisting of formaldehyde and acetaldehyde, and as an adhesive constituent the reaction product resulting from reacting of the order of 20 parts comminuted bark, 40 to 50 parts water, 5 parts sodium carbonate, and 4 parts sodium hydroxide.

12. An adhesive composition suitable for use in the manufacture of plywood, comprising 8 to 100 parts of phenol-aldehyde resin solution containing about 50% resin solids wherein the aldehyde is selected from the group consisting of formaldehyde and acetaldehyde, and as an adhesive constituent the reaction product resulting from reacting of the order of 20 parts comminuted bark, 40 to 50 parts water, 5 parts potassium carbonate, and 4 parts potassium hydroxide.

13. A process for the production of an adhesive composition, which comprises reacting a phenol-aldehyde resin wherein the aldehyde is selected from the group consisting of formaldehyde and acetaldehyde, with the reaction mass resulting from comminuted bark, water, and alkali at temperatures of about 180° F., the proportion of comminuted bark to resin being within the range of from 6 parts bark to 1 part resin to 2 parts bark to 6.5 parts resin on a dry weight basis.

14. A process for the preparation of adhesive compositions suitable for use in the manufacture of exterior grade plywood, which comprises reacting 80 to 100 parts of phenol-formaldehyde resin solution containing 50% solids with the product resulting from reacting at a temperature of the order of 180° F. of the order of 20 parts bark powder, 40 parts water, 5 parts sodium carbonate, and 4 parts sodium hydroxide.

15. A process for the preparation of adhesive compositions which comprises reacting 8 to 100 parts of a phenol-aldehyde resin solution containing 50% solids, wherein the aldehyde is selected from the group consisting of formaldehyde and acetaldehyde, with the product resulting from reacting at a temperature of the order of 180° F. 20 parts comminuted bark, 40 to 50 parts water, 5 parts sodium carbonate, and 4 parts sodium hydroxide.

16. A method for the manufacture of plywood, which comprises preparing an adhesive composition comprising an admixture of a phenol-aldehyde resin, wherein the aldehyde is selected from the group consisting of formaldehyde and acetaldehyde, and the reaction mass resulting from reacting water, at least one basic acting compound of sodium, and bark powder, forming an interface of said composition between layers of wood veneer to be united, and applying heat and pressure to the said layers and interfacial composition for setting the adhesive.

17. The method for the manufacture of plywood, which comprises reacting 8 to 100 parts of a phenol-formaldehyde resin solution containing about 50% resin solids with the reaction product resulting from reacting of the order of 20 parts bark powder, 40 to 50 parts water, 5 parts sodium carbonate, and 4 parts sodium hydroxide, forming a layer of the resulting adhesive composition between wood veneers, and effecting the setting of the adhesive composition by the application of heat and pressure.

18. A method for the production of plywood, which comprises reacting 8 to 100 parts of phenol-aldehyde resin solution containing about 50% resin solids, wherein the aldehyde is selected from the group consisting of formaldehyde and acetaldehyde, with the reaction mass resulting from reacting about 20 parts bark powder, 40 to 50 parts water, 5 parts sodium carbonate, and 4 parts sodium hydroxide, thereby forming an adhesive composition, coating the veneer surfaces to be united with the said adhesive composition with spreads of the order of 42 to 48 pounds per thousand square feet double glue line, and effecting the union of the assembled veneers by the application of heat and pressure.

19. A process for the preparation of adhesive compositions which comprises admixing with a phenol-aldehyde resin wherein the aldehyde is selected from the group consisting of formaldehyde and acetaldehyde, the reaction mass resulting from pretreating bark powder by reaction with an aqueous alkaline solution of a basic acting compound of an alkali metal at a temperature of about 180° F. for a period of about 20 minutes, said admixture being in proportions of about 70 parts of said reaction mass to 8 to 100 parts of said resin calculated on the basis of a liquid resin containing approximately 50% solids.

CLARK C. HERITAGE.

REFERENCES CITED

The following references are of record in the file of this patent:

UNITED STATES PATENTS

| Number | Name | Date |
|---|---|---|
| 118,177 | Allen | Aug. 22, 1871 |
| 1,899,768 | Nevin | Feb. 28, 1933 |
| 2,068,759 | Nevin | Jan. 26, 1937 |
| 2,233,875 | Schmidt et al. | Mar. 4, 1941 |
| 2,314,203 | Fairclough | Mar. 16, 1943 |
| 2,319,182 | Van der Pyl | May 11, 1943 |
| 2,336,672 | Collings | Dec. 14, 1943 |
| 2,360,376 | Van Epps | Oct. 17, 1944 |
| 2,380,214 | Burrell | July 10, 1945 |

FOREIGN PATENTS

| Number | Country | Date |
|---|---|---|
| 1,024 of 1870 | Great Britain | Apr. 7, 1870 |
| 12,443 of 1928 | Australia | Apr. 9, 1929 |